April 9, 1929.　　　C. O. J. MONTELIUS　　　1,708,891
ROTARY ENGINE FOR COMPRESSIBLE OR EXPANSIVE MEDIUMS
Filed Nov. 5, 1925　　2 Sheets-Sheet 1
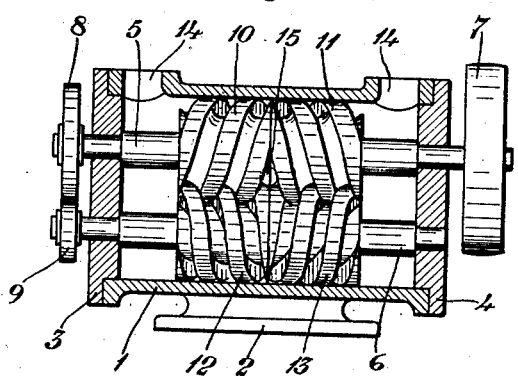
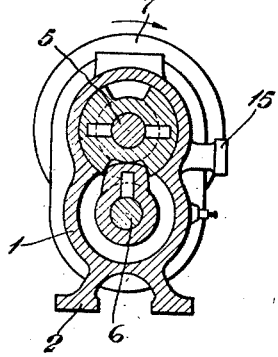
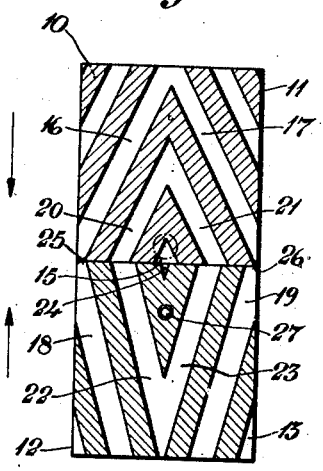
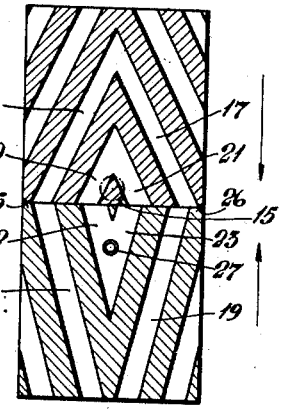
C. O. J. Montelius
INVENTOR
By: Marks and Clark
Attys April 9, 1929.  C. O. J. MONTELIUS  1,708,891
ROTARY ENGINE FOR COMPRESSIBLE OR EXPANSIVE MEDIUMS
Filed Nov. 5, 1925   2 Sheets-Sheet 2

C. O. J. Montelius
INVENTOR

By: Marks & Clark
Attys.

Patented Apr. 9, 1929.

1,708,891

UNITED STATES PATENT OFFICE.

CARL OSCAR JOSEF MONTELIUS, OF STOCKHOLM, SWEDEN.

ROTARY ENGINE FOR COMPRESSIBLE OR EXPANSIVE MEDIUMS.

Application filed November 5, 1925, Serial No. 67,166, and in Sweden November 10, 1924.

This invention relates to rotary engines for compressible or expansive mediums. According to the invention, the engine is particularly adapted to compress air or another gas to a high pressure, but may also be used as a motor, the propelling fluid being either air of a high pressure or another expansible medium, such as for instance an exploding mixture of gasolene and air.

According to the invention the device consists in the combination of a housing, at least two openings in said housing and a number of intermeshing and co-operating revoluble screws in said housing, said screws being of opposite pitch and the helicoidal surfaces of the thread of the one screw being both substantially concave and those of the thread of the co-operating screw both substantially convex, so that the screws will fit to each other along an uninterrupted contact line defined by parts of the outside edges of said helicoidal surfaces and by lines generating the outside perimeters of the the threads and by those generating the inside surfaces of the screw grooves, the grooves of each screw being closed at the one end of the screw and opening in a certain position into at least one of said openings in the housing enclosing the screws.

Figure 5:
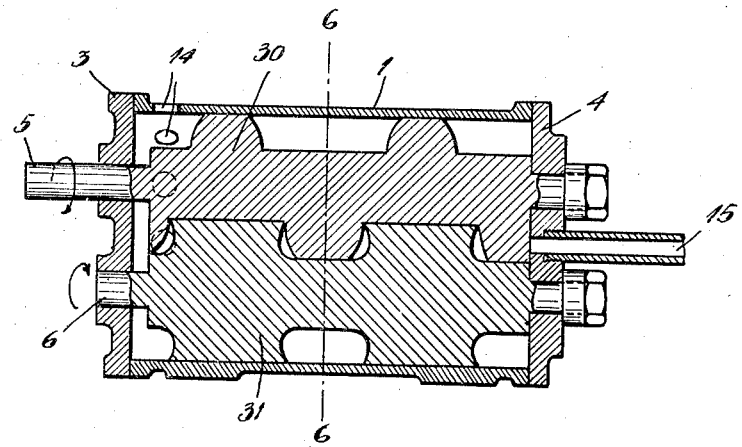
Figure 6:
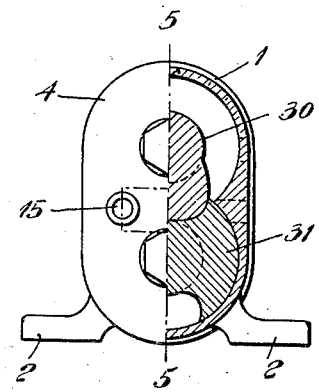

In the annexed drawings two forms of embodiment of a rotary compressor according to the invention are shown. Fig. 1 is a partial longitudinal section of the device according to the one form of embodiment, and Fig. 2 is a transverse section thereof, viewed from the left hand side of Fig. 1. Figs. 3 and 4 illustrate diagrammatically a development of the co-operating screws according to Figs. 1 and 2, showing the gase- or air-tight closures of the screws in two successive positions. Fig. 5 is a longitudinal section of the device according to the second form of embodiment along the broken line 5—5 of Fig. 6, and Fig. 6 is a partial transverse section thereof along the line 6—6 of Fig. 5, viewed from the right.

Referring to the drawing, 1 designates a housing forming an interior chamber and resting on two feet 2. Fixed to the said housing are two end plates 3 and 4 forming bearings for two parallel shafts 5 and 6, the first one of which is driven and to this end carries a pulley 7. At the opposite end the shaft 5 carries a spur wheel 8 meshing with another spur wheel 9 fixed to the shaft 6, the gear ratio being 2:1. Fixed to the shaft 5 are further two double-threaded screws 10 and 11, the screw 10 having left-hand threads and the screw 11 right-hand threads. Similarly, there are fixed to the shaft 6 two single-threaded screws 12 and 13 co-operating with the screws 10 and 11 and having right-hand and left-hand threads, respectively. The inside ends of the screws of each pair bear tightly against each other, the screw grooves corresponding to each other and forming chambers closed by the threads of the co-operating screw. Formed in the housing 1 at each end thereof are inlet openings 14.

When the shaft 5 with the screws 10 and 11 is revolved in a clockwise direction, as indicated by the arrow in Fig. 2, the air sucked through the openings 14 and into the screw grooves will be separated from the outside air and compressed.

The process is elucidated in Figs. 3 and 4, showing diagrammatically a development of all of the four screws 10, 11, 12 and 13, the grooves being indicated by plain surfaces and the threads by dashed surfaces. Fig. 3 shows four corresponding grooves 16, 17, 18 and 19 in a position open for the entrance of the outside air. In Fig. 4 the same grooves are enclosed after the driving shaft has been rotated a quarter of a revolution. After a further revolution through the same angle the positions of the said grooves will be those indicated by the plain surfaces 20, 21, 22 and 23 in Fig. 3, the enclosed volume being decreased. In the following position, indicated by the plain surfaces 20, 21, 22 and 23 in Fig. 4, the grooves are brought to such a position as to open to an outlet 15 in the side wall of the housing 1, said outlet being also shown in Figs. 1 and 2. The said outlet is to be connected to a suitable conduit, not shown in the drawing. The small volume 24 shows the position of the said screw grooves immediately before the moment when the last quantity of the compressed air has been expelled through the outlet 15.

As apparent from the above, the air sucked in through the openings 14 at the ends of the housing 1 will first enter the corresponding grooves of the co-operating screws at the opposite outer ends of the screws. During the revolution of the screws the air entering the said grooves will be enclosed, the volume being gradually decreased so as to cause a compression of the air. Upon further revolution of the screws the grooves will finally reach a position, in which they open to the outlet 15, as described above, and the compressed air will be forced out through said outlet 15, said forcing out of the air being of course continuous.

As already mentioned, a condition, which has to be fulfilled in order to obtain the said result, is this that the helicoidal surfaces of the thread of the one screw are both substantially concave and those of the thread of the co-operating screw both substantially convex as visible from Figs. 2, 5 and 6 of the drawings, so that the screws will fit to each other along an uninterrupted contact line preventing leakage from one screw groove to another.

A further condition is that the outside diameter of one screw is smaller than or at maximum as great as the inside diameter (i. e. the diameter at the bottom of the grooves) of the other screw multiplied with the gear ratio. Thus, in the device shown in Fig. 1 of the drawing, the diameter at the bottom of the grooves of the single-threaded screws 12 and 13 must not be smaller than one-half of the outside diameter of the double-threaded screws 10 and 11.

In the form of embodiment shown in Figs. 1 and 2, two screws are attached to each shaft. This is, however, not essential, since the same result may be obtained by two co-operating screws only, if said screws be placed to bear with the one end tightly against a wall closing the corresponding end of the grooves. Such an arrangement is shown in Figs. 5 and 6, the two screws 30 and 31 bearing tightly with the one end against the end plate 4 of the housing 1, the outlet 15 being made in said end plate. The double-screw arrangement shown is however more efficient and permits of a balancing of the axial forces.

As mentioned, an apparatus of the described type may also be used as a motor driven by gas or steam, in which case the driving medium enters through the opening 15 into the housing 1.

A lubricant is to be supplied to the different parts of the apparatus. In case of the apparatus operating as a compressor, lubricant may preferably be supplied in proximity to the points 25 and 26 in Figs. 3 and 4, and, when driving the apparatus as a motor, at a point in proximity to the opening 15.

What I claim is:—

1. In a rotary engine for compressible or expansible medium, the combination of a housing having at least two openings therein and a number of intermeshing and co-operating revoluble screws in said housing, said screws being of opposite pitch, and the helicoidal surfaces of the thread of the one screw being both substantially concave and those of the thread of the co-operating screw being both substantially convex, so that the screws will fit to each other along an uninterrupted contact line defined by parts of the outside edges of said helicoidal surfaces and by lines generating the outside perimeters of the threads and by those generating the inside surfaces of the screw grooves, means for closing the grooves of the screws at the one end during part of each revolution and for opening said grooves into at least one of said openings in the housing during the remaining part of the revolution.

2. In a rotary engine for compressible or expansible medium the combination of a housing having at least two openings therein and at least two pairs of intermeshing and co-operating revoluble screws in said housing, the two screws of each pair having right-hand and left-hand threads, respectively, and bearing with the adjacent ends tightly against each other, and the helicoidal surfaces of the thread of the one screw being both substantially concave and those of the thread of the co-operating screw being both substantially convex, so that the screws will fit to each other along an uninterrupted contact line defined by parts of the outside edges of said helicoidal surfaces and by lines generating the outside perimeters of the threads and by those generating the inside surfaces of the screw grooves, at least one of said openings in the housing being so located that the grooves of the screws at the end bearing against the adjacent screws are out of communication with the said opening during part of a revolution and open thereto during the remaining part of the revolution.

In testimony whereof I affix my signature.

CARL OSCAR JOSEF MONTELIUS.